United States Patent

[11] 3,593,129

| [72] | Inventors | Robert M. Wade<br>Wabash;<br>Robert M. Hazelett, Marion; Walter R. Ring, Montpelier, all of, Ind. |
|---|---|---|
| [21] | Appl. No. | 826,420 |
| [22] | Filed | May 21, 1969 |
| [45] | Patented | July 13, 1971 |
| [73] | Assignee | Anaconda Wire and Cable Company |

[54] ELECTRICAL TESTING APPARATUS
3 Claims, 3 Drawing Figs.

[52] U.S. Cl. .................................................. 324/62, 324/72.5
[51] Int. Cl. ..................................................... G01r 27/02
[50] Field of Search .......................................... 324/61, 65, 62, 72.5, 158 F

[56] References Cited
UNITED STATES PATENTS

| 1,545,186 | 7/1925 | Henriksen ................. | 324/65 |
| 2,203,839 | 6/1940 | Ogilvie ..................... | 324/65 |

*Primary Examiner*—Michael J. Lynch
*Attorney*—Victor F. Volk

ABSTRACT: For electrically testing articles, such as specimen slabs of plastic, where good electrical contact is required over large areas of the surface, the present invention provides contact apertures between which the specimen can be pressed and which are then filled with mercury by changing the position of the apparatus.

PATENTED JUL 13 1971 3,593,129

INVENTORS
R. M. WADE
R. M. HAZELETT
BY W. R. RING

THEIR AGENT 3,593,129

ELECTRICAL TESTING APPARATUS

BACKGROUND OF THE INVENTION

In the manufacture of rubber and plastic compositions for use on electrical equipment such as electric cables it has been customary to test the electrical properties of the composition from sheets or slabs having standard dimensions. It is commonly necessary, for such tests, to make electrical contact with a large area of the specimen, and for this purpose it has been known, for example in measuring the electrical capacity of a dielectric sheet, to lay the sheet in a mercury bath, place a metal ring of a selected area upon it, and cover the sheet with mercury within the confines of the ring. This method requires that the laboratory technician should pour free mercury into the ring where its upper surface is exposed and catch all the mercury in a dish or basin when the test is over. It is well known that mercury is hazardous to handle and the mercury vapor should not be allowed into the atmosphere of a laboratory. However, prior to the present invention, this hazard could not easily be avoided.

SUMMARY

We propose, by our invention, to reduce the hazard in the use of mercury for electrical testing of flat specimens.

Our apparatus has a loading and a testing position for testing an electrical property of an article having contact surfaces on opposite sides, and comprises a first container with a chamber containing electrically conducting liquid such as mercury. The container also comprises dielectric walls defining an aperture to the container communicating with the chamber. This aperture is accurately dimensioned to a selected shape and area. Our apparatus comprises a second container like the first with a chamber containing conducting liquid and walls defining an aperture. Our apparatus comprises means for securing the first and second container together with their respective apertures face to face on opposite sides of an article being tested while the apertures themselves are offset from a sufficient volume of the chambers to hold all the liquid when the apparatus is in the loading position, but have the liquid completely fill the apertures when the apparatus is in the testing position. Our apparatus further comprises individual lead means electrically contacting the liquid in each of the chambers and electrical testing means, such for two examples, as an ohmmeter and a capacitance bridge connected to the lead means.

In a preferred embodiment that has proven particularly useful for testing the electrical resistance of semiconducting plastic material our apparatus comprises a first dielectric block comprising internal walls that define a first channel that communicates from the chamber to an outside surface of the block when the block is in testing position. A dielectric tubular extension projects from the block in communication with the channel and defines a first aperture dimensioned to a selected shape and area. Our apparatus also comprises a second dielectric block with internal walls that define a second chamber and a second channel communicating from the lower portion of the chamber to an outside surface when the second block, also, is in testing position. A dielectric tubular extension projects from the second block in communication with the second channel. This extension defines a second aperture dimensioned to match the shape and area of the first aperture. There are means in our apparatus for securing the first and second blocks together with their apertures face to face on opposite sides of an article being tested and our apparatus also comprises a first and second supply of electrically conducting liquid contained respectively within the first and second chamber. Each chamber is sufficiently deep to contain the whole of its respective supply of liquid below the lowest point of its communicating aperture when the apparatus is in loading position. Drain channels may advantageously be comprised in the extensions, sloping down from the apertures when the apparatus is in loading position.

Figure 1:
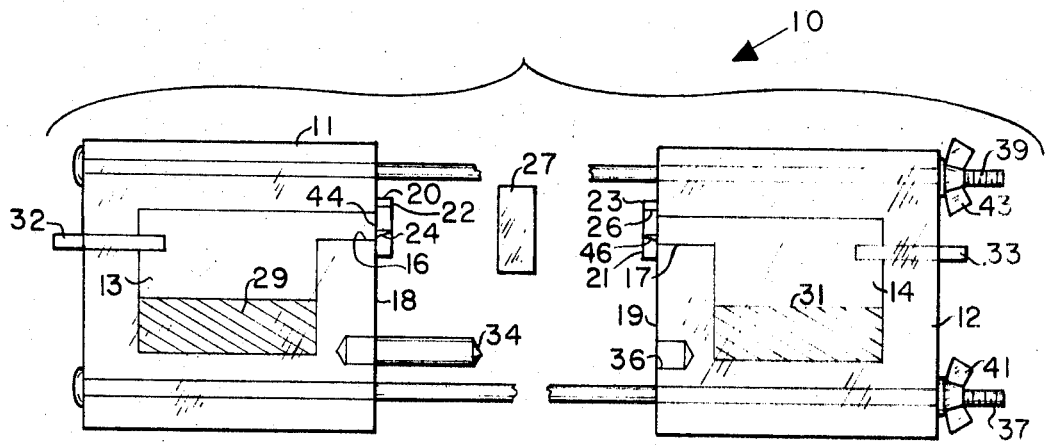
FIG. 1 shows a side view of an apparatus made to our invention in loading position.
Figure 2:
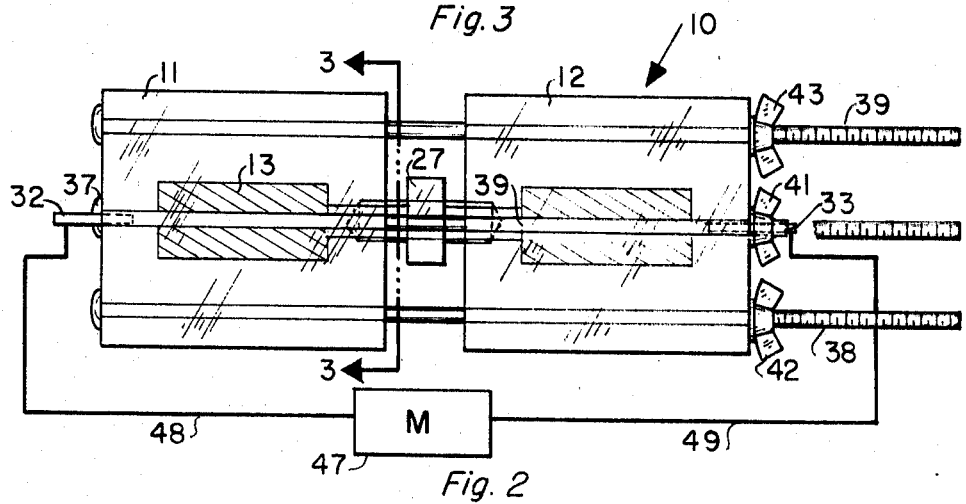
FIG. 2 shows a top view of the apparatus of FIG. 1 in testing position.

Our apparatus, indicated generally by the numeral 10 has a loading position, shown in FIG. 1, which can be changed to a testing position, shown in FIG. 2, merely by turning it bottom side up as shall be explained. The apparatus comprises two blocks 11,12 cut or assembled from dielectric material such as clear polymethylacrylate. Polyethylene, polyvinylchloride, polycarbonate, urea formaldehyde, polystyrene, polypropylene and other known dielectric materials may be used either alone or reinforced with suitable fibers.

Figure 3:
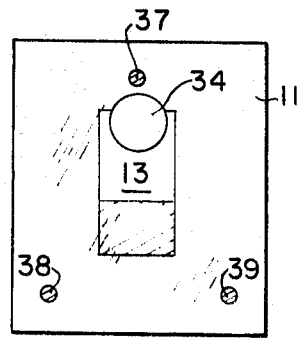
FIG. 3 shows an elevation through the lines 3–3 of FIG. 2.

The walls of plastic forming the blocks 11 and 12 define chambers 13, 14 and channels 16, 17 communicating from the chambers to the faces 18,19 of the blocks. Tubular extensions 20,21 have planar faces 22,23 that define apertures 24,26 of a selected shape. The apertures 24,26 are exactly matched so that when the apparatus is applied to a specimen 27 which may be a molded slab or a sample cut from a sheet whose electrical properties are to be measured, the effective volume involved in the electrical measurement may be readily calculated. Quantities 29,31 of mercury are contained in the chambers 13,14 which are large enough to hold all the mercury below the level of the apertures 24,26 when the apparatus is in the loading position of FIG. 1 Metal rods 32,33 serving as electrical connections extend through the walls of the blocks 11,12 into the chambers 13,14 in such a location that when the apparatus is turned over to the testing position of FIGS. 2 and 3 they will be in contact with the mercury. A centering pin 34 projecting from the block 11 fits snugly into a recess 36 in the block 12 to register the two blocks. Threaded tie rods 37,38,39 spaced 120°apart pass through matching bores in the blocks to secure them together by means of wingnuts 41,42,43 before turning the apparatus over to the test position. As shown in FIG. 1 we prefer to have the extensions 20,21 offset somewhat so that the apertures 24,26 are lower than the channels 16,17 in the testing position, thus providing a greater head of mercury and better contact. To provide positive drainage of mercury back into the chambers 29,31, sloping drain channels 44,46 are cut in the extensions 20,21. An appropriate testing instrument 47, such as an ohmmeter, is connected to the rods 32,33, by insulated wire leads 48,49 in the usual way. Other testing instruments such as galvanometers, and capacitance bridges, for two examples, may be connected across the rods 32,33 within the scope of our invention, which resides essentially in our improved apparatus for making electrical contact with the specimen.

In the use of our apparatus, the specimen 27 is inserted while the apparatus 10 is in its loading position in which it is normally stored after the removal of the preceding specimen. First, however, the blocks are sufficiently spread apart after unscrewing the wingnuts 41,43. With the specimen in place the blocks are brought together, guided accurately by the pin 34, and the wingnuts tightened. The apparatus is then turned top for bottom and the leads 48,49 connected to the contact rods 32,33. Upon turning the apparatus over the mercury flows into the channels 16,17 and apertures 24,26 making good contact with the opposite faces of the specimen and also with the rods 32,33. After the instrument 47 has been read and the test completed, the apparatus is again turned over, draining the mercury from the extensions 20,21 through the drain channels 44,46 into the chambers 13,14. When the apparatus is not in use an old specimen may be locked in position to prevent accidental loss of mercury. Although our invention has particular advantage when mercury is used as the conducting liquid other liquids such as water and salt solution, can be used within the scope of our invention.

We have invented a new and useful apparatus for electrical testing, of which the foregoing description has been exemplary rather than definitive, and for which we desire an award of Letters Patent as defined in the following claims.

We claim:
1. An apparatus having a loading and testing position for testing an electrical property of articles having contact surfaces on opposite sides comprising,
  A. a first dielectric block comprising,
    1. internal walls defining a first chamber,
    2. internal walls defining a channel communicating from the lower portion of said chamber, said block being in testing position, to an outside surface of said block,
    3. a dielectric tubular extension projecting from said block in communication with said channel, said extension defining a first aperture, and
    4. a first registration recess extending into said block from said surface,
  B. a second dielectric block comprising,
    1. internal walls defining a second chamber,
    2. internal walls defining a second channel communicating from the lower portion of said second chamber, said second block being in testing position, to an outside surface of said second block,
    3. a dielectric tubular extension projecting from said second block in communication with said second channel, said extension defining a second aperture, and
    4. a second registration recess extending into said second block from said surface of said second block,
  C. means for securing said first and second blocks together with their respective apertures face to face on opposite sides of an article being tested, and pin means snugly fitting said recesses for registering said blocks,
  D. a first and second supply of mercury respectively contained within said first and second chambers, said chambers each being sufficiently deep to contain the whole of its respective supply of mercury below the lowest point of its communicating aperture, said apparatus being in loading position,
  E. first and second electrically conducting lead means electrically contacting said first and second supplies respectively, said apparatus being in testing position, and
  F. electrical testing means connected to said first and second lead means.

2. The apparatus of claim 1 wherein said extensions comprise drain channels sloping from said apertures said apparatus being in loading position.

3. The apparatus of claim 1, wherein said testing means comprises an ohmmeter.